(12) United States Patent
Prymak

(10) Patent No.: US 7,164,573 B1
(45) Date of Patent: Jan. 16, 2007

(54) HIGH ESR OR FUSED CERAMIC CHIP CAPACITOR

(75) Inventor: John D. Prymak, Greer, SC (US)

(73) Assignee: Kemet Electronic Corporation, Greenville, SC (US)

( * ) Notice: Subject to any disclaimer, the term of this patent is extended or adjusted under 35 U.S.C. 154(b) by 0 days.

(21) Appl. No.: 11/216,259

(22) Filed: Aug. 31, 2005

(51) Int. Cl.
*H01G 4/06* (2006.01)

(52) U.S. Cl. ................ 361/321.2; 361/321.1; 361/311; 361/313; 361/306.1; 361/306.3

(58) Field of Classification Search ........... 361/306.1, 361/306.3, 321.1, 321.2, 311, 313, 303
See application file for complete search history.

(56) References Cited

U.S. PATENT DOCUMENTS

| | | | |
|---|---|---|---|
| 4,107,759 A | 8/1978 | Shirn et al. | |
| 4,193,106 A | 3/1980 | Coleman | |
| 4,680,670 A | 7/1987 | Chan | |
| 4,720,767 A | 1/1988 | Chan et al. | |
| 5,805,409 A * | 9/1998 | Takahara et al. | 361/303 |
| 5,963,416 A * | 10/1999 | Honda et al. | 361/306.1 |
| 6,011,684 A * | 1/2000 | Devoe et al. | 361/321.1 |
| 6,310,759 B1 * | 10/2001 | Ishigaki et al. | 361/309 |
| 6,381,118 B1 * | 4/2002 | Yokoyama et al. | 361/308.1 |
| 6,587,327 B1 * | 7/2003 | Devoe et al. | 361/306.3 |

* cited by examiner

*Primary Examiner*—Nguyen T. Ha
(74) *Attorney, Agent, or Firm*—J. Herbet O'Toole; Nexsen Pruet, LLC

(57) ABSTRACT

A fused or high ESR ceramic capacitor for power applications has a fuse or resistor inserted between an end termination and a terminal for one set of alternating conductive plates in the capacitor. The length and thickness of the fuse allows adjustment of the current capability of the fail-open device which provides protection for the circuit in the event of short-circuiting, or the pattern created by the thick-film resistor application defining the added ESR for the capacitor.

4 Claims, 4 Drawing Sheets

HIGH ESR OR FUSED CERAMIC CHIP CAPACITOR

BACKGROUND OF THE INVENTION

This invention relates to high ESR ceramic chip capacitors for use in high power applications and allows for the incorporation of a fuse as an integral part of the device.

BACKGROUND AND PRIOR ART

As ceramic chip capacitors achieve higher capacitances, the use of these capacitors in high power applications is increasing. With the high power applications two elements become negative factors for their usage: first, the ESR is so low with these devices that there is an increased tendency for the circuit to oscillate or ring uncontrollably, and secondly, in devices where a fault develops, the failure mode of a short-circuit raises concerns of safety.

The ESR being too low allows the oscillation because there is no damping of the pulse energy being developed and transferred back and forth between the capacitive and inductive elements of the circuit. Regardless of how low the inductance is within the chip capacitor (ESL) there is still the inductance attributable to the circuit interconnections. With a higher resistance, these pulsed energy packets are suppressed as their energy is diminished by heat dissipation.

Another debilitating effect of the low ESR is that in some regulator circuits (LDOs), the timing of the circuit depends on the RC combination of the output filter capacitors which are typically ceramic capacitors. With the negligible resistance associated with the ceramics, new resistive elements have to be added to the circuit, extraneous to the output filter capacitors, to stabilize the device. Once a fault develops within the capacitor, it will continue to draw current and burn until the current source is removed or the part is physically removed from the circuit. The obvious solution, a fuse element for each capacitor, is space and cost prohibitive in many applications.

Fused capacitors are known. U.S. Pat. No. 4,107,759 is directed to a fused, fail-open capacitor for through-hole mounting. A fusible link is connected to terminals above the body of the capacitor and the capacitor must be encased in a plastic to avoid shorting.

U.S. Pat. No. 4,193,106 discloses a ceramic capacitor with a fuse wire elevated above the body of the capacitor which must be encapsulated to avoid shorting.

U.S. Pat. No. 4,720,767 is directed to an internally fused, variable value capacitor having narrowed conductive channels within the confines of the device.

U.S. Pat. No. 4,680,670 is directed to a ceramic capacitor with fusible links at each level of the capacitor and, in theory, allows the elimination of part of the capacitor while maintaining reduce capacitance in the circuit. Troubleshooting becomes problematic.

Products according to the above-listed U.S. patents cannot be found in the fused, high ESR capacitor art despite a current and growing need for such devices.

BRIEF SUMMARY OF THE INVENTION

Standardized capacitors for surface mounting on a circuit board have specified distances from end to end so that the parts may be placed on the boards robotically and, conceptually, products from one manufacturer may be substituted for those of another. The EIA publishes standards for various sizes and solder pad geometries. If these termination ends are viewed as terminations of opposing faces of the existing block of ceramic, the present invention provides for the inclusion of a fuse or resistive element on one of the lateral face sides, between these opposing faces. In any embodiment, one termination of the interleaved conductive plates of a ceramic capacitor is brought to a surface on a side of the capacitor, not the respective ends as in conventional construction. Terminations at each end of the capacitor are applied as normal but only one end termination is connected to plates, while the other is "floating." The side termination is connected to the end termination at which the alternative plates have not been terminated (the "floating" termination), using a fusible link or resistive path to connect the new side terminal to the "floating" end termination. The relative distance from the side terminal to the end termination and the thickness of the fusible link allow for adjustments of the amperage capability and a minor adjustment of the ESR, or in the case of the resistive pattern, the material, length and width of the pattern will devine the added ESR to the capacitor. The difference of ESRs attainable between the fuse and the resistive pattern is that the added ESR of the fuse is a secondary effect created by the restrictive path created to establish a specific amperage fault capability, whereas the resistive pattern will be capable of achieving higher resistances as this is the intent of these creations.

DETAILED DESCRIPTION OF THE INVENTION

Figure 1A:
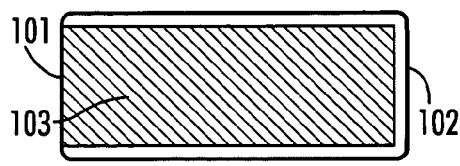
FIG. 1A illustrates the construction of a first plate of a prior art capacitor.
Figure 1B:
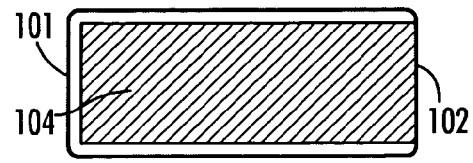
FIG. 1B illustrates the construction of a second plate of a prior art capacitor.
Figure 1C:
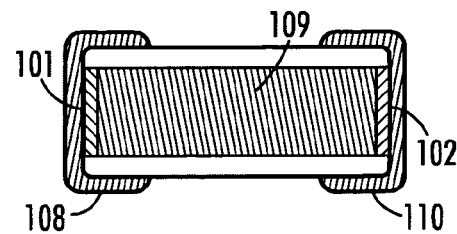
FIG. 1C illustrates the basic combination of 1A and 1B is a single unit for a conventional prior art capacitor.

The formation of a conventional, prior art, two-terminal multilayer ceramic capacitor is shown in FIGS. 1A, 1B, and 1C. FIG. 1A is an illustration of one layer within the multilayer structure with an electrode plate 103 that extends to one edge 101, with a margin along the remaining three edges. The edge 101 is exposed and utilized as an electrical contact to the plate 103, once the capacitor is assembled. In FIG. 1B, the adjacent layer shows the electrode plate 104 extending to the edge 102 that is opposite of the previous termination edge 101. FIG. 1C shows how these plates overlap and create an effective area 109 with margins along all edges. The termination edges for plate 103 extend from the effective area 109 to the left edge 101, while the termination edges for plate 104 are shown to extend to the right edge 102. A termination paste (108 and 110) is applied to cover these edges and connect all like terminated plates together. The over-wrap of the termination paste (108 and 110) along the bottom of the chip, affords metallic strips extending from the face of the ceramic that are utilized to solder mount this capacitor to the circuit board. These terminations (108 and 110) create the two contacts for this two-terminal device.

Figure 2A:
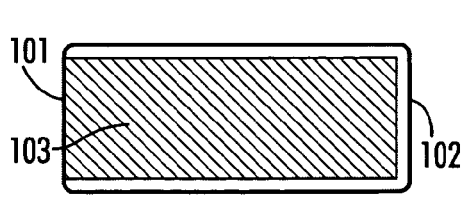
FIG. 2A illustrates the construction of a first plate of a capacitor according to this invention—same as FIG. 1A.
Figure 2B:
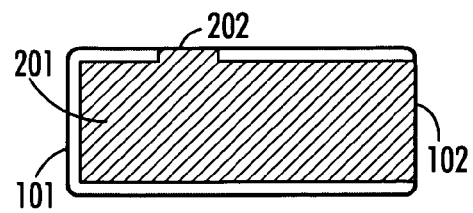
FIG. 2B illustrates the construction of a second plate of a capacitor according to this invention.
Figure 2C:
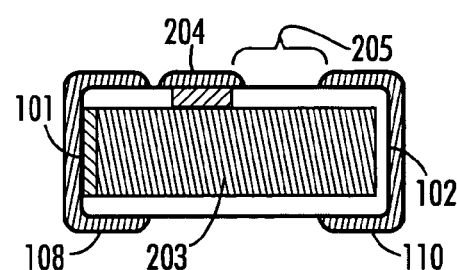
FIG. 2C illustrates a basic view of plate overlap created by combining 201 and 202, of a capacitor according to this invention.

FIGS. 2A, 2B and 2C illustrate the modification required for this invention. As in FIG. 1A, in FIG. 2A the electrode plate 103 is shown extending to the left edge of the capacitor body (101) with a margin along the other three edges. In this drawing, FIG. 2B is considerably different from FIG. 1B. The electrode plate 201 does not extend to the right edge 102, but rather is brought out to edge 202 in a band much narrower than the length of this edge. In FIG. 2C, the terminations of the opposing edges 101 and 102 take place as previous (FIG. 1C), but an additional contact is created with a termination stripe at 205 along the top face of the capacitor. The termination contacts to the plates are along 108 at edge 101 in contact with plate 103, and the termination stripe 204 in contact with plate 201. The separation 205 along the top surface affords a placement for an additional element along this surface (fuse or resistor as defined infra) to be connected in series with the capacitor. Termination over-wraps of 108, 110' allow solder contact between this device and the circuit board. The element inserted between 204' and 110 will now be seen as being in a series circuit connection to the capacitance connected between 108 and 204.

Figure 3:
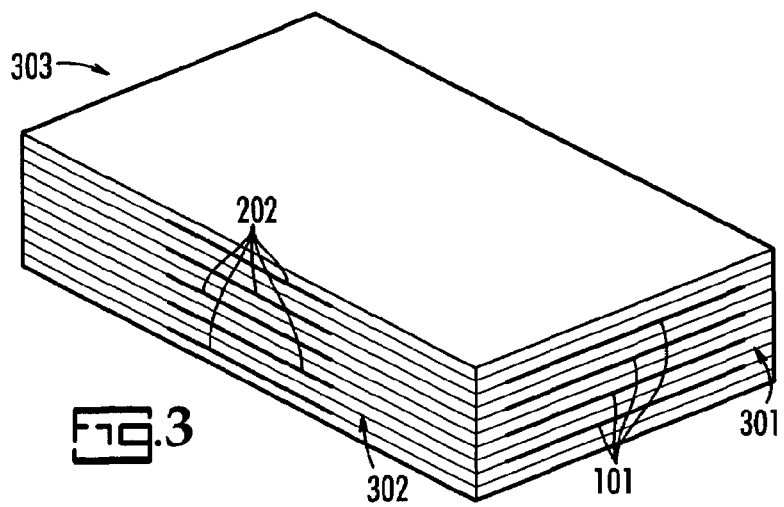
FIG. 3 is an isometric view of stacked capacitor plates and edge contacts in the termination regions according to this invention.

FIG. 3 is an isometric view of this device and shows the plate edges (101 and 202) extending to the surface of faces 301, 302, respectively. The end terminations will fully envelope faces 301 and 303 (opposite faces of block), with a stripe termination on face 302, overlapping exposed edges 202, but fully separated from both end terminations at faces 301 and 303 (not visible). The dimensions of this chip are of the same dimensions as a standard chip. This disclosure will focus on size 1206 and larger chips, as these devices will allow large areas for the placement of the secondary element between the floating termination and one of the end terminations.

Figures 4A, 4B, 4C:
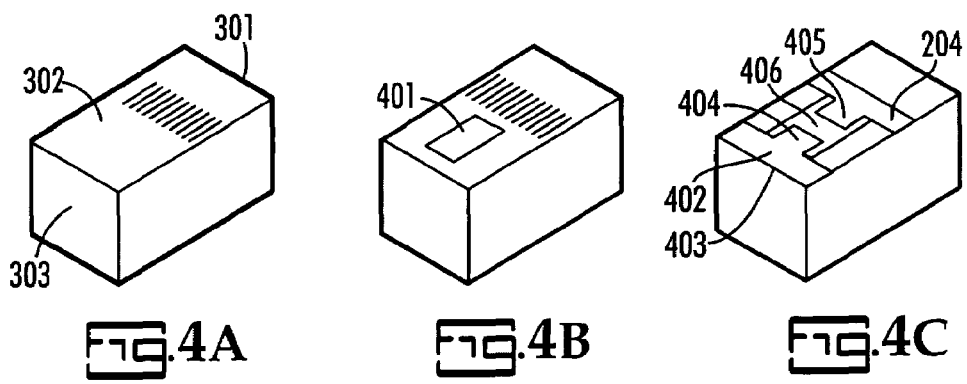
FIG. 4A begins an illustration of the steps for forming a capacitor according to this invention beginning with a block of fired ceramic.
FIG. 4B shows the location of a passivation layer (if required).
FIG. 4C shows the location and application of electrode termination patterns to the ceramic face for the placement of a fusible link.
Figures 4D, 4E, 4F:
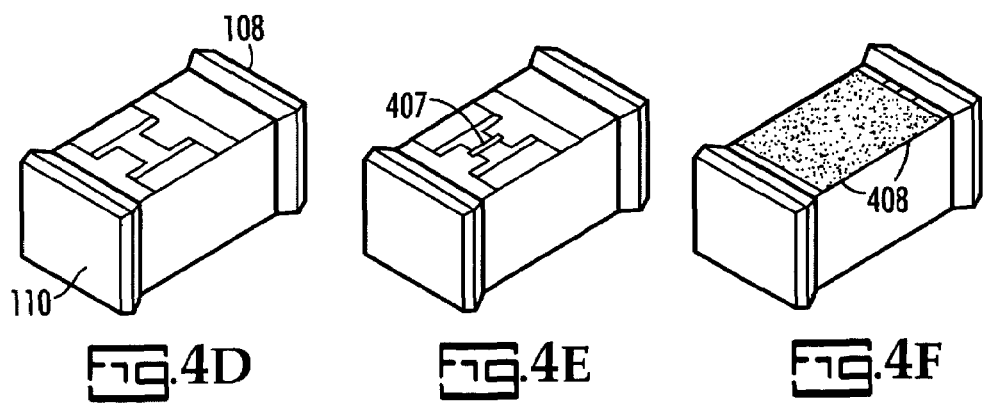
FIG. 4D illustrates the application of conventional terminations to device at the ends of the device.
FIG. 4E illustrates the location and placement of fusible link between side and end terminations of the device.
FIG. 4F shows the area over which a passivation layer is applied over exposed connections, if required to eliminate any extraneous contact from interfering with the added fuse element.

FIGS. 4A, 4B, 4C, 4D, 4E and 4F show the steps that might be required to create the fusible link for the device. Starting out with a block of fired ceramic (4A) the view shows faces 302 and 303, with face 301 hidden (termination face for 101 edge contacts). The mid-chip electrodes 202, appear along the top face 302. In FIG. 4B, a glass passivation or substrate treatment 401 may be required over the ceramic in the area the fusible link is to be created. An electrode termination pattern would then be applied to the top face 302 to cover the top termination edges 204. An additional pattern 402 would be applied to face 302, from the edge 403 (where faces 303 and 302 come together), along face 302, back towards the mid-chip termination 204. Patterned lands (404 and 405) could create smaller compact patterns extending toward each other while still maintaining an appropriate gap 406. The "normal" end terminations (110 and 108) are applied to the opposite faces of the chip as shown in FIG. 4D. A narrow, very thin fusible link 407 between the land extensions 404, 405 would then be used to connect the side termination 204 to the floating edge termination 110. To protect the electrical exposure of this secondary element, a passivation film (insulative epoxy or glass type materials) would then be applied over it shown as 408.

Figure 5A:
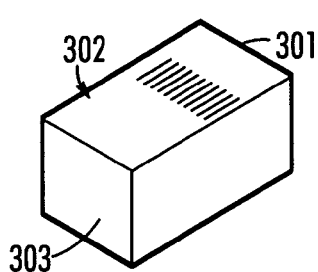
FIG. 5A begins an illustration of the steps in building a resistive element on a device, starting with a fired capacitor—same as FIG. 4A.
Figure 5B:
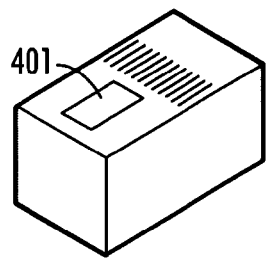
FIG. 5B shows the location of a passivation layer (if required—same as 4B).
Figure 5C:
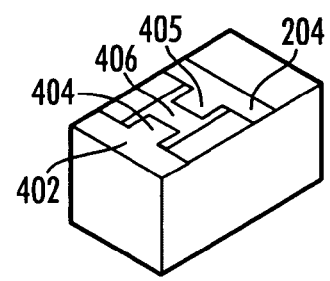
FIG. 5C illustrates the location of initial end termination extension and mid-chip termination electrode with narrowed extensions reaching into the passivation region.
Figure 5D:
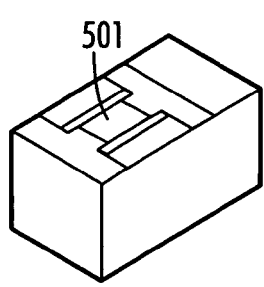
FIG. 5D illustrates the location and relative dimension of a resistive ink pattern between within the define electrode gap.
Figure 5E:
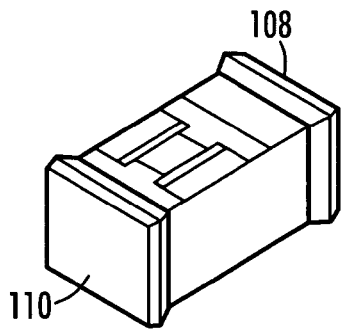
FIG. 5E illustrates the application of conventional terminations to device at the ends of the device.
Figure 5F:
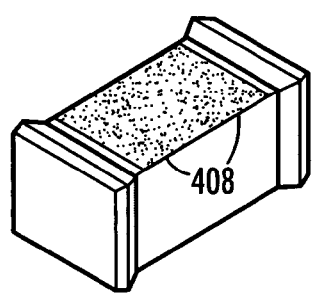
FIG. 5F shows the location of a final passivation or insulative layer (if needed).

FIGS. 5A, 5B, 5C, 5D, 5E, and 5F illustrate the application of resistive segment. To build a resistive element in this gap may require the same ceramic capacitor chip design detailed in FIGS. 4A, 4B, and 4C, detailed again as 5A, 5B, and 5C. The glass passivation 401 of FIG. 5B may be necessary as some resistive inks interact with the $BaTiO_2$ based ceramics. The 302 face terminations 402 and 204 of FIG. 5C are nearly identical to the fuse device in FIG. 4C. Of most importance is the dimension of the gap 406 created by the smaller extensions 404 and 405 in FIG. 5C. This separation, in conjunction with the resistivity of the paste, will determine the final resistance value created here. The resistive ink composed of ruthenium, carbon, or metallic compounds is applied across the gap 406, within the gap and width constraints created with patterns 404 and 405 and shown in FIG. 5D, thereby creating the resistor connection in series with the capacitor. End terminations 110, 108 are then applied as in FIG. 5E, followed by a protective layer 408 over the face of the device between the terminations as shown in FIG. 5F.

Figure 6A:
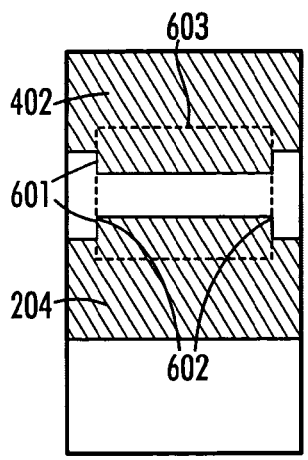
FIGS. 6A and 6B illustrate how dimensional changes in the patterns of the resistive inks can be used to adjust resistivity.
Figure 6B:
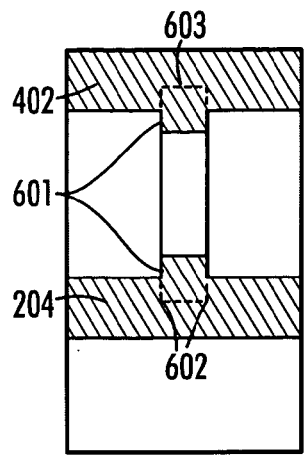

FIGS. 6A and 6B detail the pattern capabilities of this device that are used to vary the value of resistance required. The dimensions created in FIGS. 6A and 6B defined by the gap length 601 and gap width 602 allow for the placement of an ink pattern to fill area 603. Assuming that in FIG. 6A, that the gap is 0.10 inches and the gap width is 0.04 inches, then the gap dimension is four times as wide as it is long. As an aspect ratio, this gap can be defines as 0.25 squares (0.01/0.04). Using commercially available resistive ink with a rating of 0.10 ohms/square, and multiplying by the gap aspect ratio, the resistance created in this pattern would be 0.025 ohms. If the pattern shown in FIG. 6B was 0.030 inches long (601), and 0.010 inches wide (602), defining and aspect ratio of 3, then using that same ink in pattern 603 in FIG. 6B would create a resistance of 0.30 ohms. The accuracy of the resistor created is dependent on the consistency of the pattern (601), and the thickness of the ink laid down in that pattern.

Figure 7A:
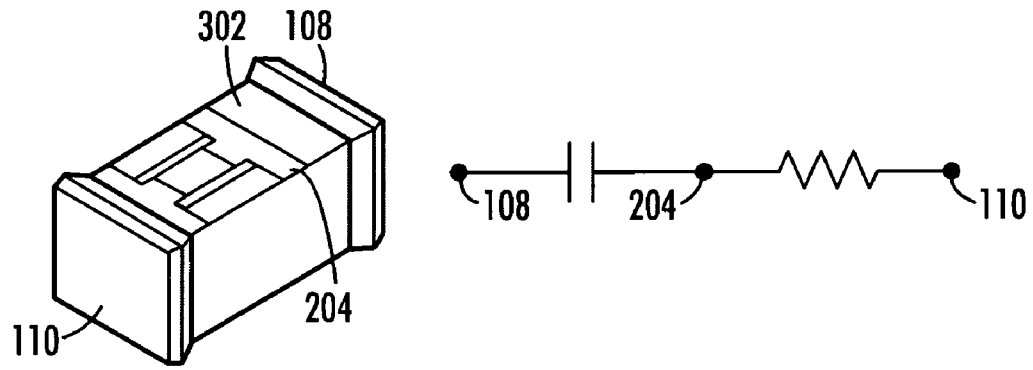
FIG. 7A shows the electrical schematic of the corresponding RC chip according to this invention.

FIG. 7A shows the electrical schematic with nodes defined in FIG. 5E. The capacitance is across nodes (terminations) 108 and 204. The resistive element is created between nodes (terminations) 204 and 110. When the device is mounted to the PCB, terminations 108 and 110 are in contact with the two solder pads located on the PCB. The circuit sees two elements, resistor and capacitor, within this two-terminal device.

Figure 7B:
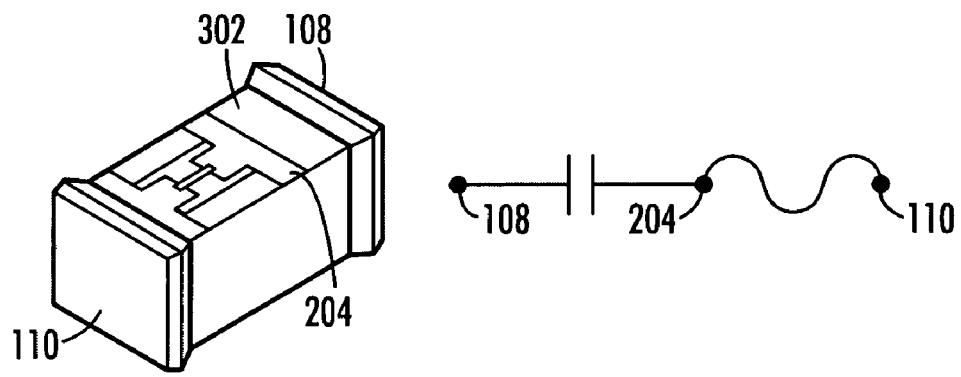
FIG. 7B shows electrical schematic presentations of the corresponding fused capacitor according to this invention.

FIG. 7B shows the electrical schematic presentation of FIG. 4E. The capacitor is defined between nodes (terminations) 108 and 204. Between nodes (terminations) 204 and 110, a fusible link is created along the exterior face (302) of the device. Termination contact to the PCB is created between terminations 108 and 110, which are connected to the two solder pads on the PCB. Within these two terminal contacts, the circuit realizes a fuse and capacitor series combination. Any dielectric fault created in the ceramic that draws sufficient current trough the fuse will cause the fuse to activate and "open" the circuit.

INDUSTRIAL UTILITY

The fused high ESR ceramic capacitor according to this invention is preferred for power application where oscillation damping is needed and the arrangement of side termination and fuse line allows selection of ESR as required.

Additional advantages include a broadened frequency response and a reduction in piezoelectric effects. The fuse also takes the entire capacitor out of the circuit in the event of a short circuit, reducing potential damage to the remainder of the circuit.

The invention has been described in terms of specific embodiments that are not limitations of the scope of the invention. Modifications and additions obvious to those with skill in the art are included within the spirit and scope of the invention.

I claim:

1. A surface mount ceramic capacitor having interleaved conductive plates and ceramic insulating layers further comprising:
    a) terminals of one set of alternating conductive plates formed at an end surface of said capacitor;
    b) terminals of a second set of alternating conductive plates formed at a side surface of said capacitor;
    c) conductive end terminations for connection to printed circuit board;
    d) a fuse connection formed on the surface between said terminal of said second set of alternating conductive plates and a termination not connected to said terminal of one set of alternating conductive plates,
    e) or resistive pattern formed on the surface between said terminal of said second set of alternating conductive plates and a termination not connected to said terminal of one set of alternating conductive plates.

2. A ceramic capacitor according to claim 1 further comprising a passivating layer between said fuse or resistor connection and said ceramic insulating layer.

3. A ceramic capacitor according to claim 1 wherein said terminal of a second set of conductive plates is on a side surface which is in a plane 90° to the plane of the end termination planes.

4. A ceramic capacitor according to claim 2 further comprising an insulating layer on said fuse on a side away from said passivating layer.

* * * * *